(12) United States Patent
Shmilovich et al.

(10) Patent No.: US 10,086,927 B2
(45) Date of Patent: Oct. 2, 2018

(54) THERMALLY CONTROLLED ACTIVE FLOW CONTROL SYSTEM

(71) Applicant: The Boeing Company, Chicago, IL (US)

(72) Inventors: Arvin Shmilovich, Huntington Beach, CA (US); Edward Andrew Whalen, St. Louis, MO (US)

(73) Assignee: The Boeing Company, Chicago, IL (US)

( * ) Notice: Subject to any disclaimer, the term of this patent is extended or adjusted under 35 U.S.C. 154(b) by 170 days.

(21) Appl. No.: 15/131,393

(22) Filed: Apr. 18, 2016

(65) Prior Publication Data
US 2017/0297680 A1   Oct. 19, 2017

(51) Int. Cl.
| | |
|---|---|
| *B64C 21/04* | (2006.01) |
| *F15B 21/12* | (2006.01) |
| *F15C 1/00* | (2006.01) |
| *B64D 33/02* | (2006.01) |

(52) U.S. Cl.
CPC ............. *B64C 21/04* (2013.01); *F15B 21/12* (2013.01); *F15C 1/00* (2013.01); *B64C 2230/04* (2013.01); *B64C 2230/06* (2013.01); *B64C 2230/10* (2013.01); *B64C 2230/18* (2013.01); *B64D 2033/0213* (2013.01); *B64D 2033/0226* (2013.01); *Y02T 50/166* (2013.01); *Y10T 137/87265* (2015.04)

(58) Field of Classification Search
CPC ....... B64C 21/025; B64C 21/04; B64C 21/08; B64C 2230/04; B64C 2230/06; B64D 13/006; B64D 13/08; B64D 2013/0607; B64D 2013/0614; B64D 2013/0622; B64D 2013/0666; B64D 15/02; B64D 15/04; B64D 15/06; B64D 15/08; B64D 2033/0226; B64D 2033/0233; B64D 2033/024; B64D 2033/0213; B64D 2230/10; Y10T 137/87332; Y10T 137/6416; Y10T 137/2652; Y10T 137/2562; Y10T 137/87265; Y10T 137/87788

USPC ......... 137/334, 599.01, 599.08, 110, 118.02, 137/872; 244/207, 134 B; 392/347–385, 392/465–496

See application file for complete search history.

(56) References Cited

U.S. PATENT DOCUMENTS

| | | | | |
|---|---|---|---|---|
| 2,453,721 A | * | 11/1948 | Mercier | B64C 23/005 244/130 |
| 2,563,054 A | * | 8/1951 | Messinger | B64D 15/02 126/110 E |
| 2,973,922 A | * | 3/1961 | Davidson | B64C 23/005 244/15 |
| 3,085,740 A | * | 4/1963 | Wagner | B64C 23/00 244/200 |
| 3,253,808 A | * | 5/1966 | La Fave | B64C 23/00 244/207 |

(Continued)

*Primary Examiner* — Craig J Price
(74) *Attorney, Agent, or Firm* — Yee & Associates, P.C.

(57) ABSTRACT

A method and apparatus are presented. An active flow control system comprises a flow control valve, a manifold, and a temperature control system. The flow control valve is configured to control a flow of air into the manifold. The manifold is operatively connected to a number of actuators. The temperature control system is configured to heat at least a portion of the flow of air.

20 Claims, 13 Drawing Sheets

(56) References Cited

U.S. PATENT DOCUMENTS

| | | | | |
|---|---|---|---|---|
| 3,669,386 A | * | 6/1972 | Jacobs | B64C 9/38 244/207 |
| 4,061,996 A | * | 12/1977 | Gupta | B64D 43/02 244/201 |
| 4,099,691 A | * | 7/1978 | Swanson | B64C 21/04 244/134 B |
| 5,114,100 A | * | 5/1992 | Rudolph | B64C 21/06 244/130 |
| 5,899,416 A | * | 5/1999 | Meister | B64C 21/06 244/207 |
| 8,827,212 B1 | | 9/2014 | Shmilovich et al. | |
| 9,090,326 B2 | | 7/2015 | Whalen et al. | |

* cited by examiner

THERMALLY CONTROLLED ACTIVE FLOW CONTROL SYSTEM

BACKGROUND INFORMATION

1. Field

The present disclosure relates generally to flow control and, in particular, to an active flow control system. More particularly, the present disclosure relates to decreasing the input in a flow control system on an aircraft.

2. Background

Flow control is an emerging technology which aims at enhancing the aerodynamic performance and efficiency of flight vehicles. A flow control system includes a flow control actuator for supplying a gas flow over an aerodynamic structure. Flow control systems with fluidic devices are effective and use an air supply as input. Energizing the airflow over an aerodynamic surface using small jets of air will increase the performance and efficiency of the aerodynamic surface. The higher the flow control performance target, the higher the fluidic input for the flow control system. By increasing performance of the flow control system, mass flow into the flow control system is also increased.

To provide higher fluidic input, greater system resources are used. If engine bleed is used, for example, engine size may be increased to provide higher fluidic input. However, increasing engine size also increases the weight of the engine, thus increasing the airplane gross weight.

Therefore, it would be desirable to have a method and apparatus that take into account at least some of the issues discussed above, as well as other possible issues.

SUMMARY

In one illustrative embodiment, an active flow control system comprises a flow control valve, a manifold, and a temperature control system. The flow control valve is configured to control a flow of air into the manifold. The manifold is operatively connected to a number of actuators. The temperature control system is configured to heat at least a portion of the flow of air.

In another illustrative embodiment, a method is provided. A flow of air is controlled into a manifold operatively connected to a number of actuators of an active flow control system. At least a portion of the flow of air is heated using a temperature control system to form a heated portion. The heated portion is directed towards the number of actuators.

In yet another illustrative embodiment, a method is provided. Active flow control having a desired momentum is provided using an active flow control system having a number of actuators. A mass flow through the number of actuators is decreased while maintaining the desired momentum from the number of actuators.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that the mass flow rate and the momentum through an actuator are based on the thermodynamic properties of a fluid. For example, the mass flow rate and momentum are influenced by the pressure and the temperature of the fluid.

The illustrative embodiments recognize and take into account that a compressor or an auxiliary power unit may supply the fluid to an actuator array rather than an engine. However, a compressor or an auxiliary power unit may add weight to the aircraft. As a result, the illustrative embodiments recognize and take into account that using the least amount of air flow for the system may be desirable regardless of whether the flow is supplied by an engine, a compressor, or an auxiliary power unit.

Figure 1:
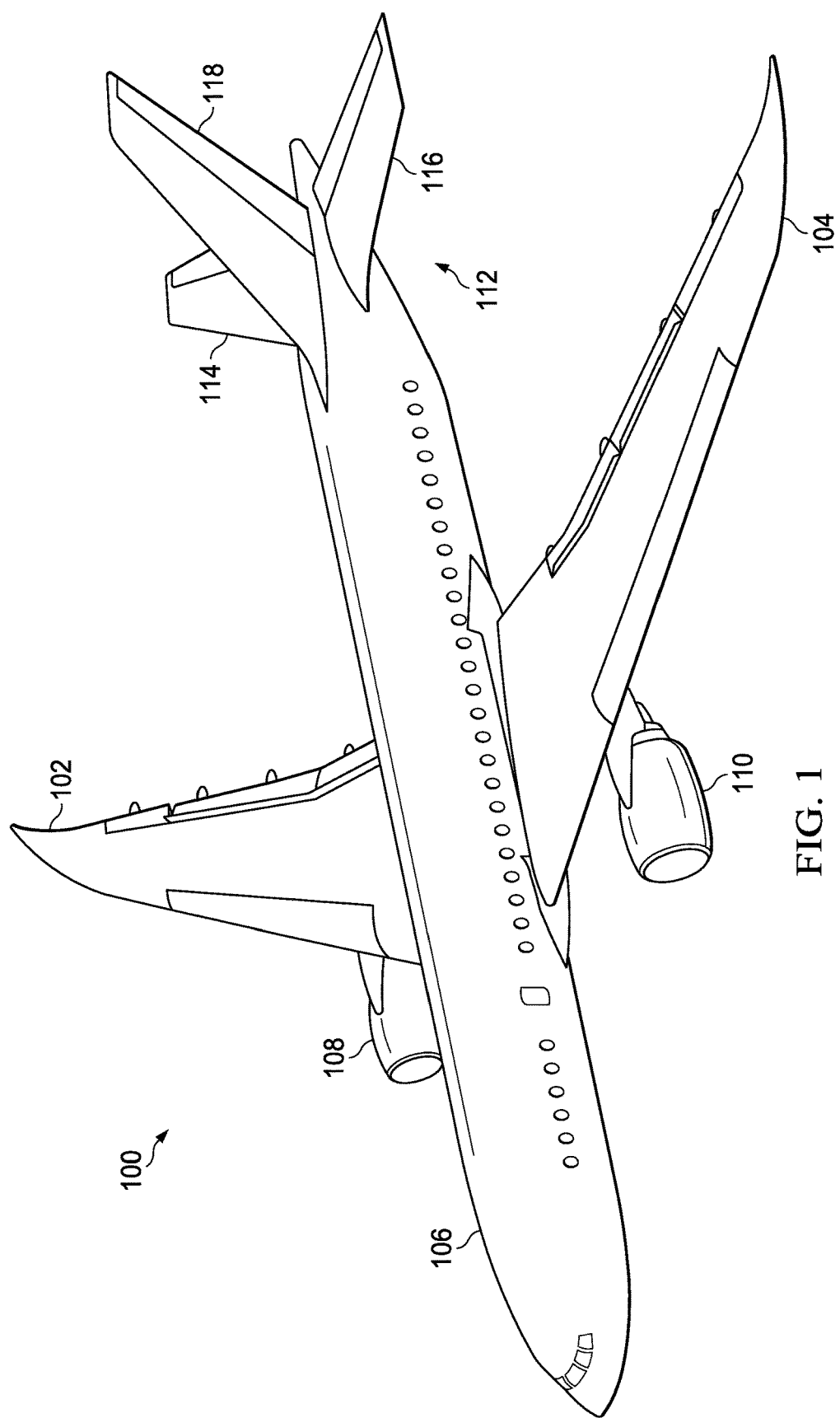
FIG. 1 is an illustration of an aircraft in which an illustrative embodiment may be implemented.

Referring now to the figures and, in particular, with reference to FIG. 1, an illustration of an aircraft is depicted in which an illustrative embodiment may be implemented. In this illustrative example, aircraft 100 has wing 102 and wing 104 attached to body 106. Aircraft 100 includes engine 108 attached to wing 102 and engine 110 attached to wing 104. Body 106 has tail section 112. Horizontal stabilizer 114, horizontal stabilizer 116, and vertical stabilizer 118 are attached to tail section 112 of body 106.

Aircraft 100 is an example of an aircraft having an active flow control system. For example, a thermally controlled active flow control system may enhance performance and efficiency of aerodynamic structures in at least one of tail section 112, wing 102, or wing 104.

This illustration of aircraft 100 is provided for purposes of illustrating one environment in which the different illustrative embodiments may be implemented. The illustration of aircraft 100 in FIG. 1 is not meant to imply architectural limitations as to the manner in which different illustrative embodiments may be implemented. For example, aircraft 100 is shown as a commercial passenger aircraft. The different illustrative embodiments may be applied to other types of aircraft, such as a private passenger aircraft, a rotorcraft, or other suitable types of aircraft.

Although the illustrative examples for an illustrative embodiment are described with respect to an aircraft, an illustrative embodiment may be applied to other types of platforms. The platform may be, for example, a mobile platform, a stationary platform, a land-based structure, an aquatic-based structure, or a space-based structure. More specifically, the platform may be a surface ship, a tank, a personnel carrier, a train, a spacecraft, a space station, a satellite, a submarine, an automobile, a manufacturing facility, a building, or other suitable platforms.

Figure 2:
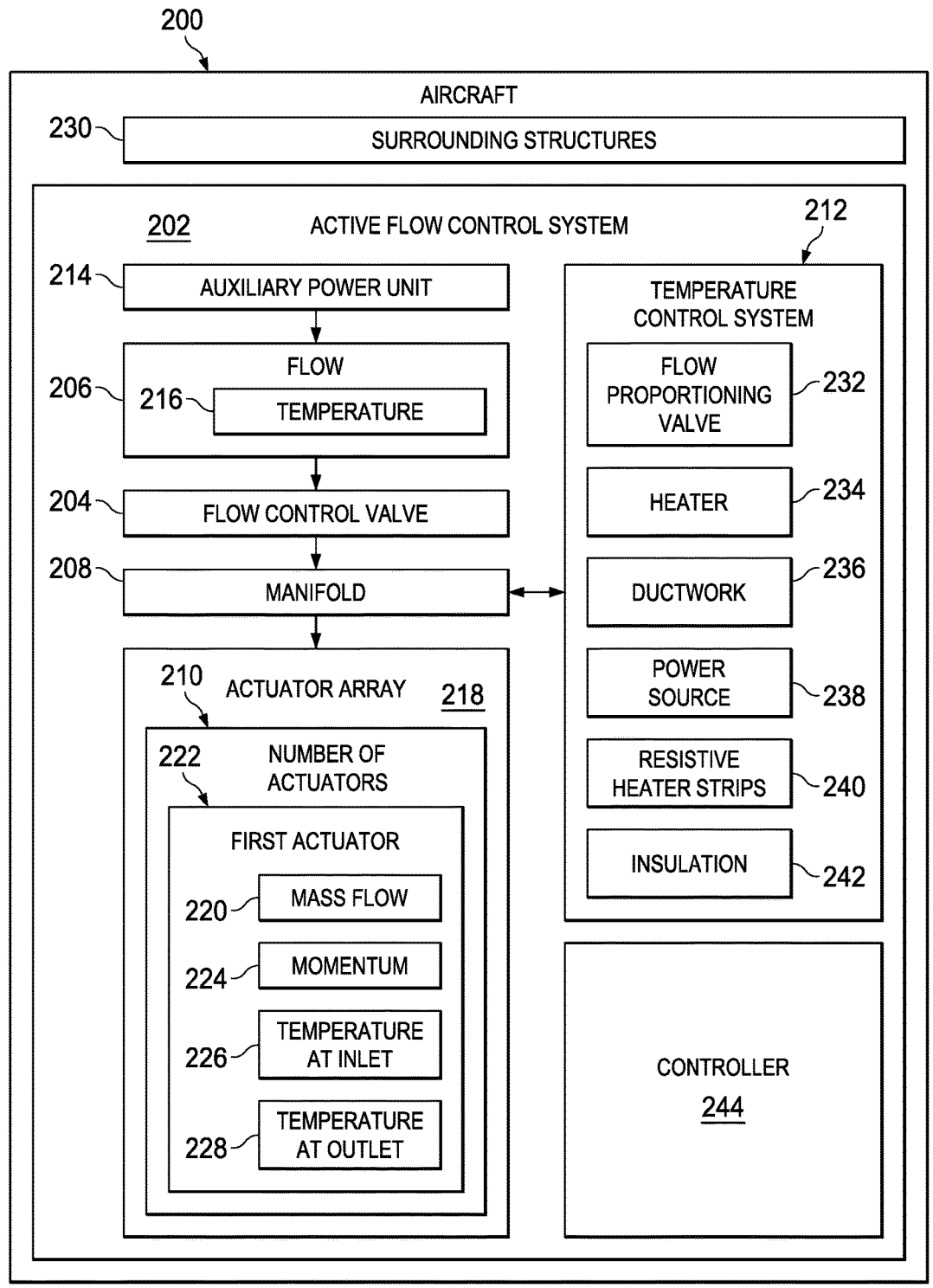
FIG. 2 is an illustration of a block diagram of an aircraft in accordance with an illustrative embodiment.

Turning now to FIG. 2, an illustration of a block diagram of an aircraft is depicted in accordance with an illustrative embodiment. Aircraft 200 is an example of systems of aircraft 100 in FIG. 1 depicted in block format. Active flow control system 202 of FIG. 2 may be implemented in any desirable portion of aircraft 100. For example, active flow control system 202 may be associated with tail section 112 of aircraft 100.

Active flow control system includes flow control valve 204 configured to control flow 206 of air into manifold 208. Manifold 208 is operatively connected to number of actuators 210. Temperature control system 212 is configured to heat at least a portion of flow 206.

Auxiliary power unit 214 provides flow 206 having temperature 216 to manifold 208 of active flow control system 202. Flow 206 is the input to active flow control system 202. Temperature 216 may be any desirable temperature. For example, temperature 216 may be within the range of ambient temperature to approximately 800 degrees Fahrenheit. The ambient temperature is the temperature outside of aircraft 200. Flow 206 is introduced into manifold 208. Manifold 208 directs flow 206 towards actuator array 218 which includes number of actuators 210. Actuator array 218 directs jets of air outside of aircraft 200.

Temperature control system 212 increases the temperature of at least a portion of flow 206. By heating at least a portion of flow 206, mass flow 220 through first actuator 222 of number of actuators 210 is reduced. By increasing the temperature of at least a portion of flow 206, mass flow 220 through first actuator 222 is decreased without undesirably affecting momentum 224 provided by first actuator 222.

Temperature control system 212 may take different optional forms. In a first illustrative example, temperature control system 212 redirects the portion of flow 206 from manifold 208 and then reintroduces the heated portion back into manifold 208. In a second illustrative example, temperature control system 212 heats flow 206 as it travels through at least one of a portion of manifold 208 or actuator array 218.

As used herein, the phrase "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, thing, or a category.

For example, "at least one of item A, item B, or item C" may include, without limitation, item A, item A and item B, or item B. This example also may include item A, item B, and item C or item B and item C. Of course, any combinations of these items may be present. In other examples, "at least one of" may be, for example, without limitation, two of item A; one of item B; and ten of item C; four of item B and seven of item C; or other suitable combinations.

Using temperature control system 212, temperature at inlet 226 is greater than temperature 216 of flow 206 entering manifold 208. Temperature of mass flow 220 through first actuator 222 decreases from the inlet of first actuator 222 to the outlet of first actuator 222. Thus, temperature at inlet 226 is greater than temperature at outlet 228.

Surrounding structures 230 of aircraft 200 may be undesirably affected by high temperatures. By temperature of mass flow 220 decreasing through first actuator 222, surrounding structures 230 of aircraft 200 are not undesirably affected by the output of first actuator 222.

In a first example, temperature control system 212 includes flow proportioning valve 232, heater 234, and ductwork 236. Heater 234 is configured to heat at least a portion of flow 206 of air to form a heated portion. Flow proportioning valve 232 directs the at least a portion of flow 206 of air towards heater 234. Ductwork 236 extends through a portion of manifold 208. Ductwork 236 directs the heated portion towards number of actuators 210.

Ductwork 236 has any desirable sized and shaped cross-section. In some illustrative examples, ductwork 236 has more than one cross-section. The number of cross-sections of ductwork 236 may be selected from square, rectangular, circular, oval-shaped, or any other desirable shape.

There is a space between ductwork 236 and manifold 208. The space is configured to insulate surrounding structures 230. By insulating surrounding structures 230, surrounding structures 230 may be protected from undesirable amounts of heat.

In a second example, temperature control system 212 includes power source 238, resistive heater strips 240, and insulation 242. Resistive heater strips 240 are operatively connected to power source 238. Resistive heater strips 240 are positioned in a portion of manifold 208. In some illustrative examples, heater material is positioned within each of number of actuators 210. The heater material may be substantially the same material as resistive heater strips 240. Insulation 242 is positioned between manifold 208 and surrounding structures 230. Insulation 242 protects surrounding structures 230 from undesirable amounts of heat.

Resistive heater strips 240 and other heater material positioned in at least one of a portion of manifold 208 or number of actuators 210 heats flow 206 of air as flow 206 passes through manifold 208 and actuator array 218. More specifically, air is heated as it travels past resistive heater strips 240 and other heater material. In this illustrative example, resistive heater strips 240 and other heater material of temperature control system 212 heats all of flow 206. By heating flow 206, mass flow through actuator array 218, including mass flow 220 through first actuator 222, is decreased.

Controller 244 of active flow control system 202 controls operation of at least one of flow control valve 204 or temperature control system 212. Controller 244 may be implemented using hardware, software, firmware, or a combination thereof. When software is used, the operations performed by controller 244 may be implemented using, for example, without limitation, program code configured to run on a processor unit, such as processor unit 1404 illustrated below in FIG. 14. When firmware is used, the operations performed by controller 244 may be implemented using, for example, without limitation, program code and data and may be stored in persistent memory to run on the processor unit.

When hardware is employed, the hardware may include one or more circuits that operate to perform the operations performed by controller 244. Depending on the implementation, the hardware may take the form of a circuit system, an integrated circuit, an application specific integrated circuit (ASIC), a programmable logic device, or some other suitable type of hardware device configured to perform any number of operations.

A programmable logic device may be configured to perform certain operations. The device may be permanently configured to perform these operations or may be reconfigurable. A programmable logic device may take the form of, for example, without limitation, a programmable logic array, a programmable array logic, a field programmable logic array, a field programmable gate array, or some other type of programmable hardware device.

In some illustrative examples, the operations and/or processes performed by controller 244 may be performed using organic components integrated with inorganic components. In some cases, the operations and/or processes may be performed entirely by organic components, excluding a human being. As one illustrative example, circuits in organic semiconductors may be used to perform these operations and/or processes.

Controller 244 may be implemented within a computer system. The computer system may be comprised of one or more computers. When more than one computer is present in the computer system, these computers may be in communication with each other.

The illustration of aircraft 200 in FIG. 2 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, rather than auxiliary power unit 214, active flow control system 202 may include a compressor. As another example, rather than auxiliary power unit 214, active flow control system 202 may include bleed from an engine of aircraft 200.

Figure 3:
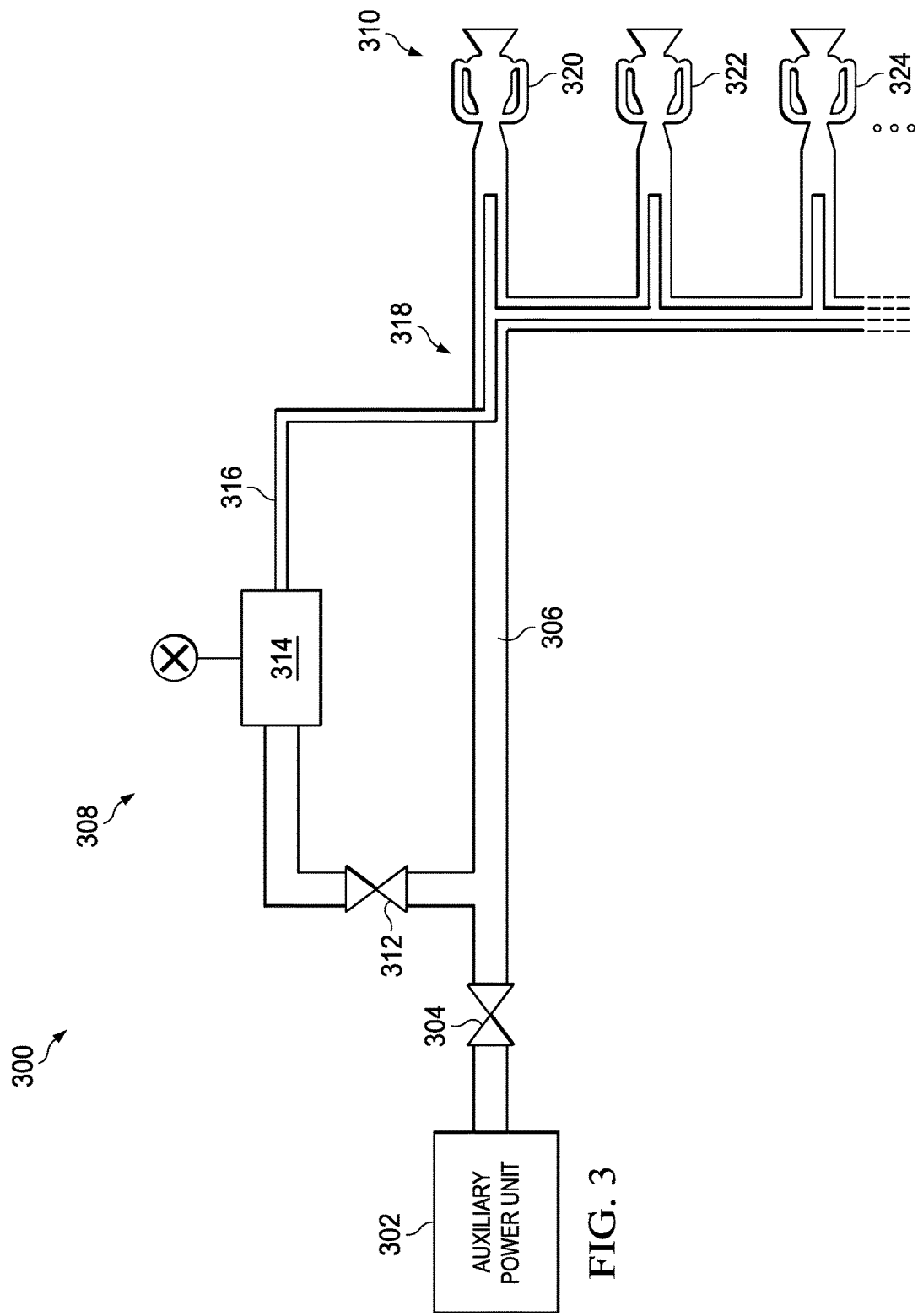
FIG. 3 is an illustration of an active flow control system in accordance with an illustrative embodiment.

Turning now to FIG. 3, an illustration of an active flow control system is depicted in accordance with an illustrative embodiment. Active flow control system 300 is a diagram depiction of active flow control system 202 of FIG. 2. Active flow control system 300 may be used to provide flow control to aircraft 100 of FIG. 1.

Active flow control system 300 includes auxiliary power unit 302, flow control valve 304, manifold 306, temperature control system 308, and actuator array 310. Auxiliary power unit 302 provides a flow of air to manifold 306.

As depicted, temperature control system 308 heats a portion of the flow of air provided by auxiliary power unit 302. Temperature control system 308 includes flow proportioning valve 312, heater 314, and ductwork 316. Flow proportioning valve 312 directs a portion of the flow of air towards heater 314. Heater 314 is configured to heat the portion of the flow of air received from flow proportioning valve 312 to form a heated portion.

The heated portion travels through ductwork 316 towards actuator array 310. Ductwork 316 extends through portion 318 of manifold 306. Ductwork 316 directs the heated portion towards first actuator 320, second actuator 322, and third actuator 324 of actuator array 310. Although actuator array 310 is depicted as having three actuators, actuator array 310 may have any desirable number of actuators. In one illustrative example, actuator array 310 has more than three actuators. In another illustrative example, actuator array 310 has fewer than three actuators.

The heated portion will mix with the remainder of the flow of air within actuator array 310. By heating the portion of the flow of air, momentum provided by actuator array 310 remains substantially the same while mass flow through actuator array 310 is decreased.

Figure 4:
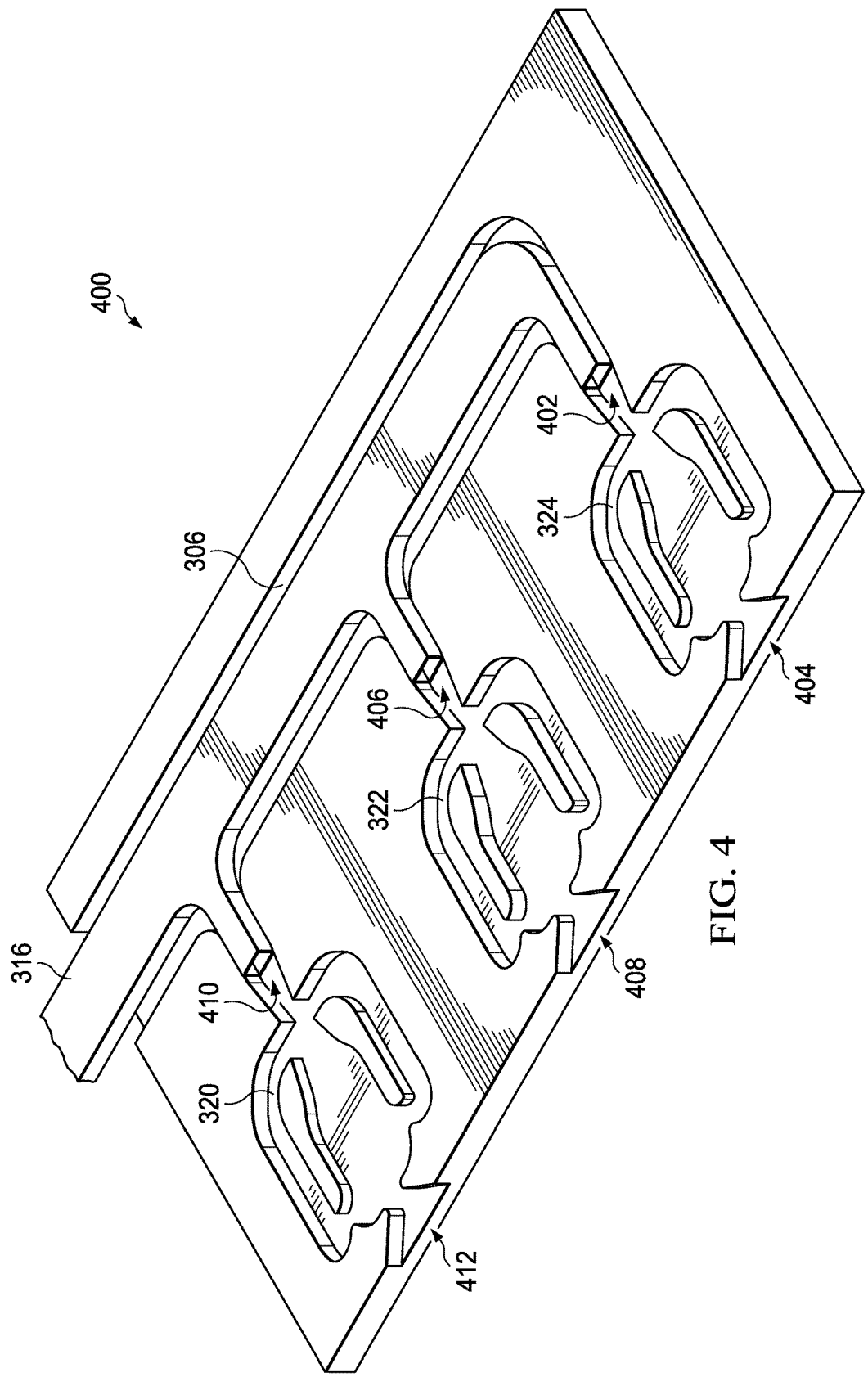
FIG. 4 is an illustration of a cross-sectional view of actuators of an active flow control system in accordance with an illustrative embodiment.

Turning now to FIG. 4, an illustration of a cross-sectional view of actuators of an active flow control system is depicted in accordance with an illustrative embodiment. View 400 is an isometric cross-sectional view of one physical implementation of actuator array 310 of FIG. 3. Cross-sections of first actuator 320, second actuator 322, and third actuator 324 of actuator array 310 are visible in view 400. In this implementation, ductwork 316 has a rectangular cross-section. Ductwork 316 extends through the portion of manifold 306 supplying a heated portion of air to first actuator 320, second actuator 322, and third actuator 324.

The heated portion supplied by ductwork 316 mixes with the remainder of the flow traveling in the space between ductwork 316 and manifold 306. The heated portion and the remainder of the flow enter first actuator 320, second actuator 322, and third actuator 324 of actuator array 310.

The temperature of air entering third actuator 324 at inlet 402 is greater than the temperature of air exiting third actuator 324 at outlet 404. The temperature of air entering second actuator 322 at inlet 406 is greater than the temperature of air exiting second actuator 322 at outlet 408. The temperature of air entering first actuator 320 at inlet 410 is greater than the temperature of air exiting first actuator 320 at outlet 412.

Figure 5:
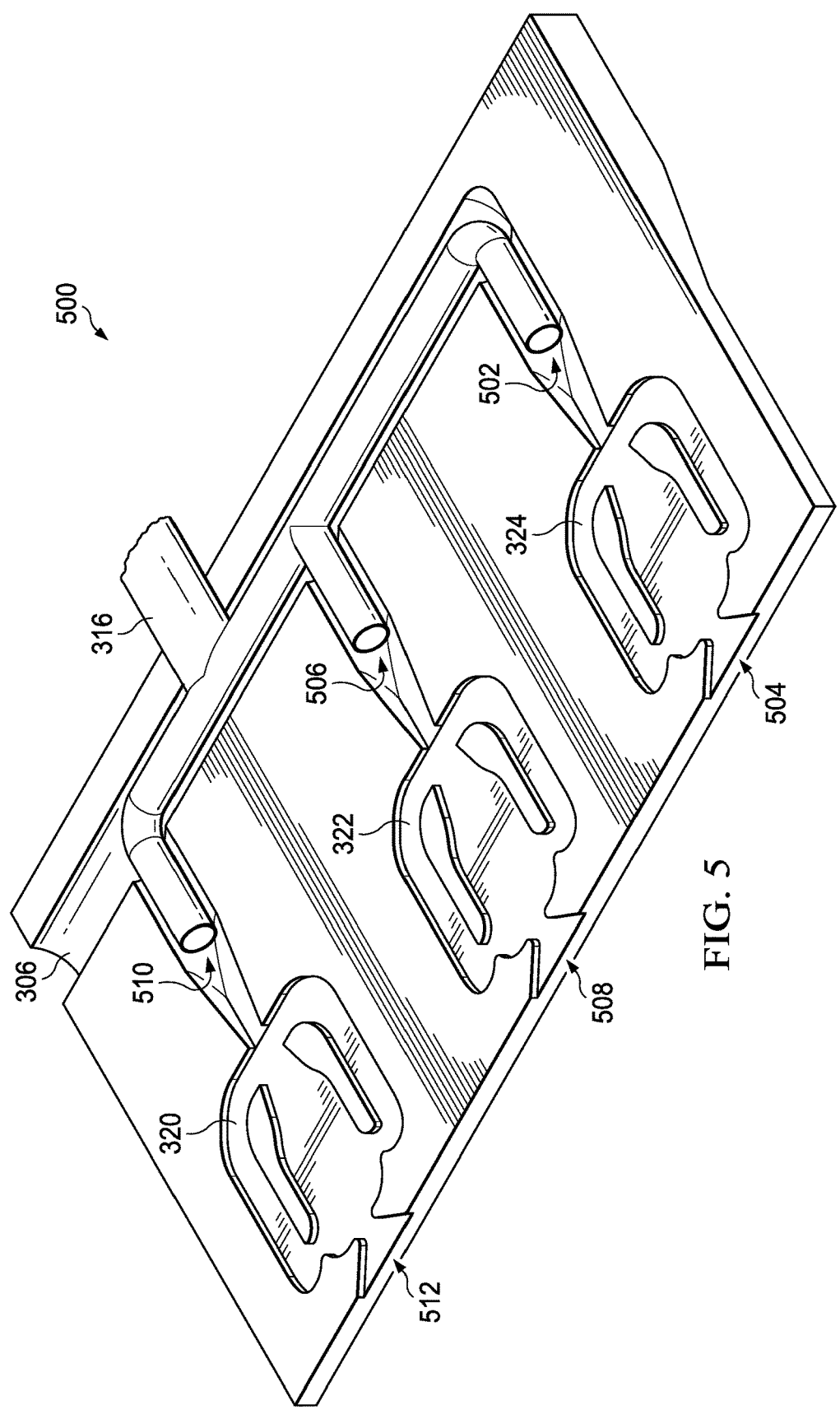
FIG. 5 is an illustration of a cross-sectional view of actuators of an active flow control system in accordance with an illustrative embodiment.

Turning now to FIG. 5, an illustration of a cross-sectional view of actuators of an active flow control system is depicted in accordance with an illustrative embodiment. View 500 is an isometric cross-sectional view of one physical implementation of actuator array 310 of FIG. 3. Cross-sections of first actuator 320, second actuator 322, and third actuator 324 of actuator array 310 are visible in view 500. In this implementation, ductwork 316 has a circular cross-section and an oval cross-section. Ductwork 316 extends through the portion of manifold 306 supplying heated portion of air to first actuator 320, second actuator 322, and third actuator 324.

The heated portion supplied by ductwork 316 mixes with the remainder of flow traveling in the space between ductwork 316 and manifold 306. The heated portion and the remainder of the flow enter first actuator 320, second actuator 322, and third actuator 324 of actuator array 310.

The temperature of air entering third actuator 324 at inlet 502 is greater than the temperature of air exiting third actuator 324 at outlet 504. The temperature of air entering second actuator 322 at inlet 506 is greater than the temperature of air exiting second actuator 322 at outlet 508. The temperature of air entering first actuator 320 at inlet 510 is greater than the temperature of air exiting first actuator 320 at outlet 512.

Figure 6:
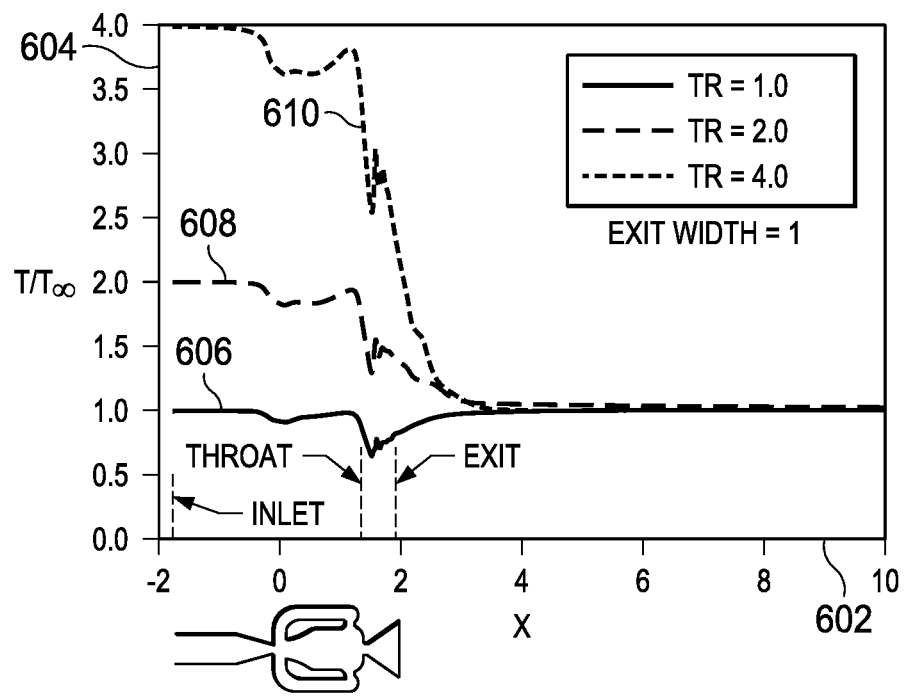
FIG. 6 is an illustration of thermal profiles for an active flow control system in accordance with an illustrative embodiment.

Turning now to FIG. 6, an illustration of thermal profiles for an active flow control system is depicted in accordance with an illustrative embodiment. Thermal data 600 is an example of thermal data from an actuator of actuator array 310 of FIG. 3. Thermal data 600 may be an example of thermal data from an actuator of actuator array 218 of FIG. 2.

Thermal data 600 includes x-axis 602 and y-axis 604. X-axis 602 is a distance measurement. Y-axis 604 is a ratio of the temperature of air entering an inlet over the ambient temperature. Line 606 represents the temperature of air along the center line of an actuator with a temperature equal to the ambient level at the inlet. The ambient temperature is sometimes referred to as the conventional temperature. Line 608 represents the temperature of air along the centerline of an actuator with twice the conventional air temperature at the inlet. Line 610 represents the temperature of air along the centerline of an actuator with four times the conventional air temperature at the inlet.

As depicted, the temperature of air exiting the actuator in line 610 is only twice the temperature of the conventional air flow input. The temperature of air exiting the actuator in line 608 is less than 1.5 times the temperature of the conventional air flow input.

Each of line 606, line 608, and line 610 converge outside of the actuator in less than the length of the actuator. As depicted, each of line 606, line 608, and line 610 converge outside of the actuator in about one fourth the length of the actuator.

Due to the relatively rapid convergence of line 606, line 608, and line 610, surrounding structures may not be undesirably affected. More specifically, the output of line 608 or line 610 may not undesirably affect surrounding structures.

Figure 7:
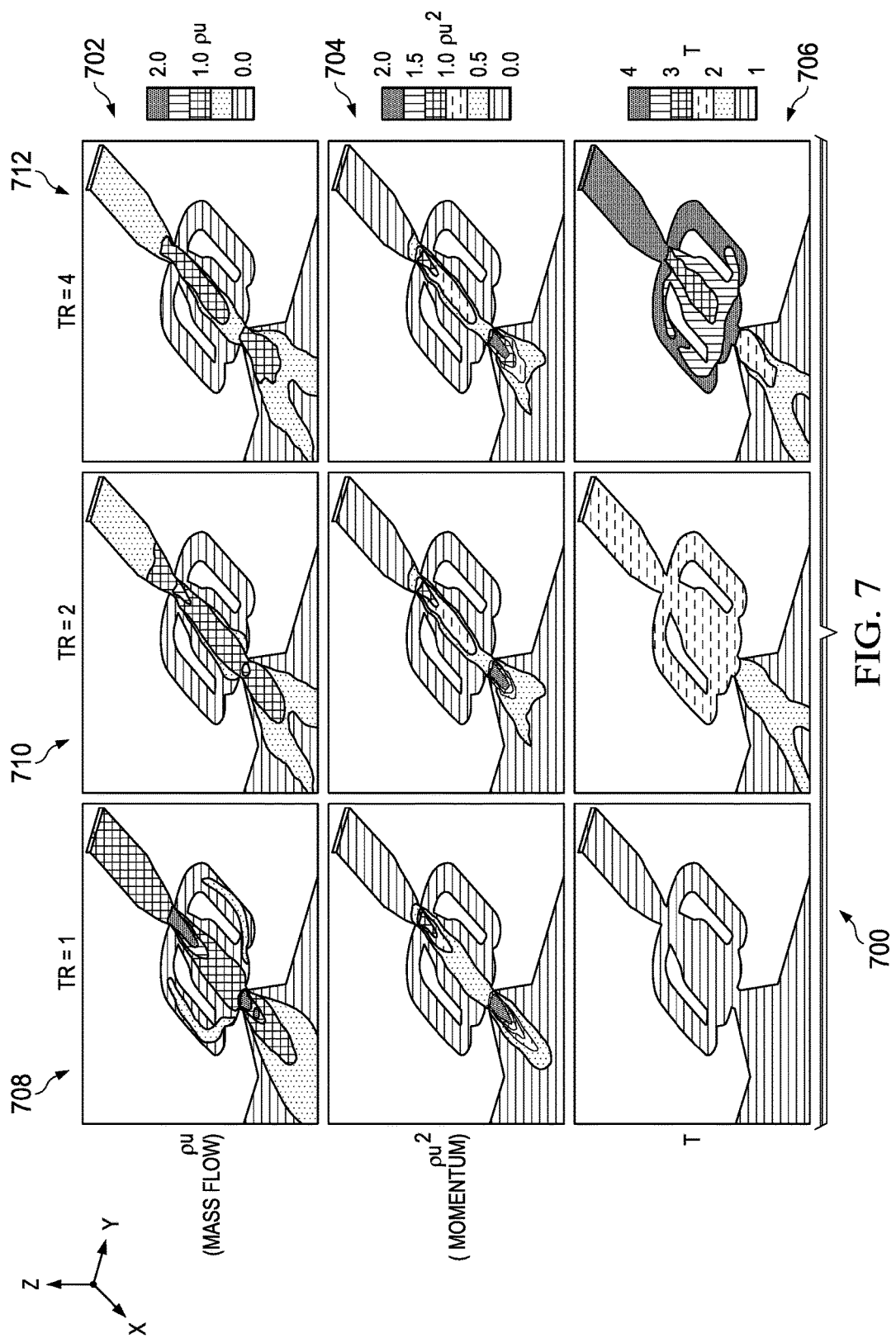
FIG. 7 is an illustration of the effect of heated air supply to an actuator in accordance with an illustrative embodiment.

Turning now to FIG. 7, an illustration of the effect of heated air supply to an actuator is depicted in accordance with an illustrative embodiment. FIG. 7 depicts flow properties in a slice that cuts through the center of the actuator. Actuator characteristics 700 are an example of characteristics of an actuator of actuator array 310 of FIG. 3. Actuator characteristics 700 may be an example of characteristics of an actuator of actuator array 218 of FIG. 2.

Characteristics 700 include mass flow 702, momentum 704, and temperature 706. Mass flow 702 is the mass flow entering an inlet of the actuator normalized by the ambient conditions. Momentum 704 is the momentum entering an inlet of the actuator normalized by the ambient conditions. Temperature 706 is the temperature entering an inlet of the actuator normalized by the ambient temperature.

First column 708 depicts characteristics for an inlet temperature of ambient temperature. The ambient temperature is sometimes referred to as the conventional temperature. Second column 710 depicts characteristics for an inlet temperature of twice the conventional temperature at the inlet. Third column 712 depicts characteristics for an inlet temperature of four times the conventional temperature at the inlet.

As can be seen in characteristics 700, mass flow 702 decreases with increased temperature at the inlet. For example, mass flow 702 is greater for first column 708 than either of second column 710 or third column 712. Further, mass flow 702 for third column 712 is less than second column 710.

Although mass flow 702 decreases with increased temperature, momentum 704 stays substantially the same with increased temperature. For example, momentum 704 for first column 708, second column 710, and third column 712 appear substantially the same.

Additionally, temperature 706 of air exiting the actuator for each of first column 708, second column 710, and third column 712 will not undesirably affect surrounding structures. As shown, temperature 706 of air exiting the actuator for third column 712 is greater than first column 708 and second column 710, but quickly dissipates.

As can be seen in FIG. 7, having a higher temperature of air traveling through an actuator can decrease the mass flow through the actuator without undesirably decreasing momentum. Characteristics 700 of FIG. 7 are for an active flow control system having a heater and ductwork. However, decreased mass flow and substantially the same momentum also results from other embodiments of a temperature control system, such as the temperature control system in FIGS. 8 and 9 below.

Figure 8:
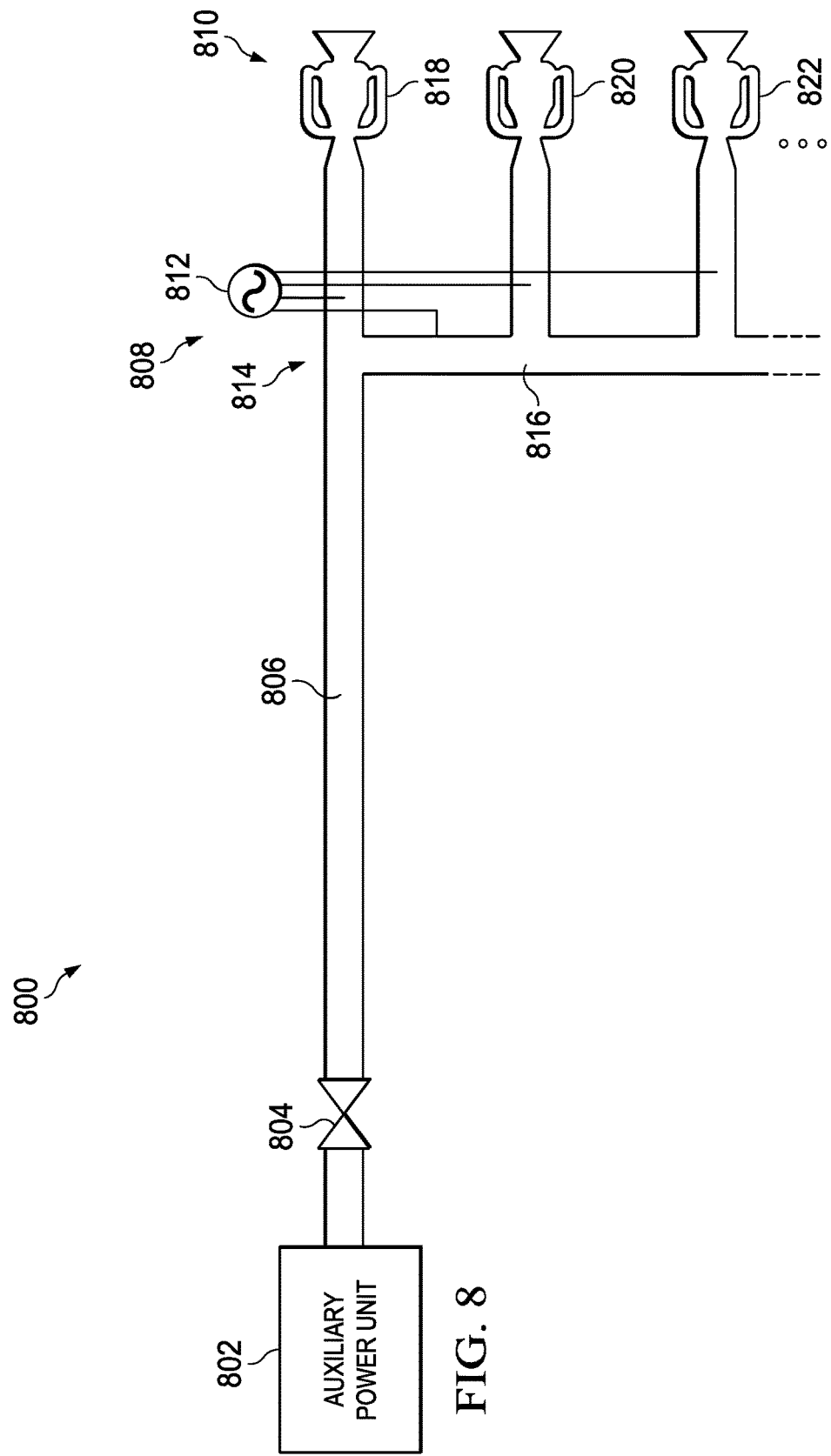
FIG. 8 is an illustration of another active flow control system in accordance with an illustrative embodiment.

Turning now to FIG. 8, an illustration of another active flow control system is depicted in accordance with an illustrative embodiment. Active flow control system 800 is a diagram depiction of active flow control system 202 of FIG. 2. Active flow control system 800 may be used to provide flow control to aircraft 100 of FIG. 1.

Active flow control system 800 includes auxiliary power unit 802, flow control valve 804, manifold 806, temperature control system 808, and actuator array 810. Auxiliary power unit 802 provides a flow of air to manifold 806.

As depicted, temperature control system 808 heats the air provided by auxiliary power unit 802. Temperature control system 808 includes power source 812, resistive heater strips 814, and ductwork 816. Power source 812 provides power to resistive heater strips 814. Resistive heater strips 814 and heating material positioned within at least one of manifold 806 or actuator array 810 heat the air as it travels past the resistive heater strips 814 and other heating material. In some examples, ductwork 816 takes the form of heating material.

In some illustrative examples, heating material may only be present within actuator array 810. As depicted, actuator array 810 includes first actuator 818, second actuator 820, and third actuator 822.

Although not visible in active flow control system 800, insulation may be present between ductwork 816 and surrounding structures. Further, insulation may be present between actuator array 810 and surrounding structures.

Figure 9:
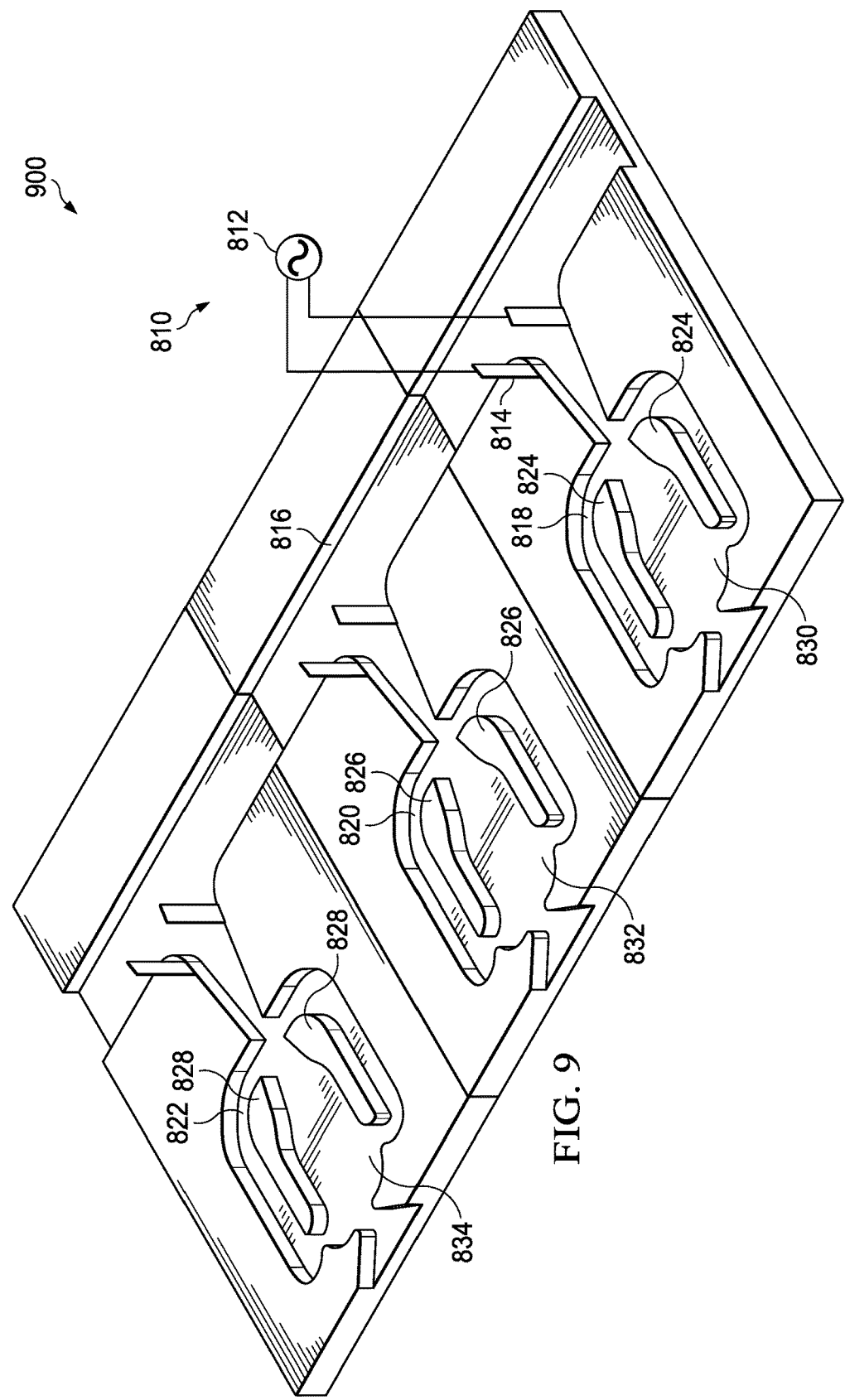
FIG. 9 is an illustration of a cross-sectional view of actuators of an active flow control system in accordance with an illustrative embodiment.

Turning now to FIG. 9, an illustration of a cross-sectional view of actuators of an active flow control system is depicted in accordance with an illustrative embodiment. View 900 is an isometric cross-sectional view of one physical implementation of actuator array 810. Cross-sections of first actuator 818, second actuator 820, and third actuator 822 of actuator array 810 are visible in view 900. Resistive heater strips 814 are clearly seen in view 900.

As depicted, heater material lines the internal surfaces of first actuator 818, second actuator 820, and third actuator 822 of actuator array 810. By having heater material blanketing all surfaces of an actuator, maximum heat transfer to the fluid within the actuator occurs. For example, vertical walls 824 of first actuator 818, vertical walls 826 of second actuator 820 and vertical walls 828 of third actuator 822 are covered with heater material. Further, heater material covers bottom wall 830 of first actuator 818, bottom wall 832 of second actuator 820 and bottom wall 834 of third actuator 822. Although the top walls of first actuator 818, second actuator 820, and third actuator 822 are not depicted, heater material may also cover the tops walls.

Although this illustrative example includes heater material lining all internal surfaces of each of first actuator 818, second actuator 820, and third actuator 822, in some other examples heater material is only present on a portion of an internal surface of at least one of first actuator 818, second actuator 820, or third actuator 822.

Figure 10:
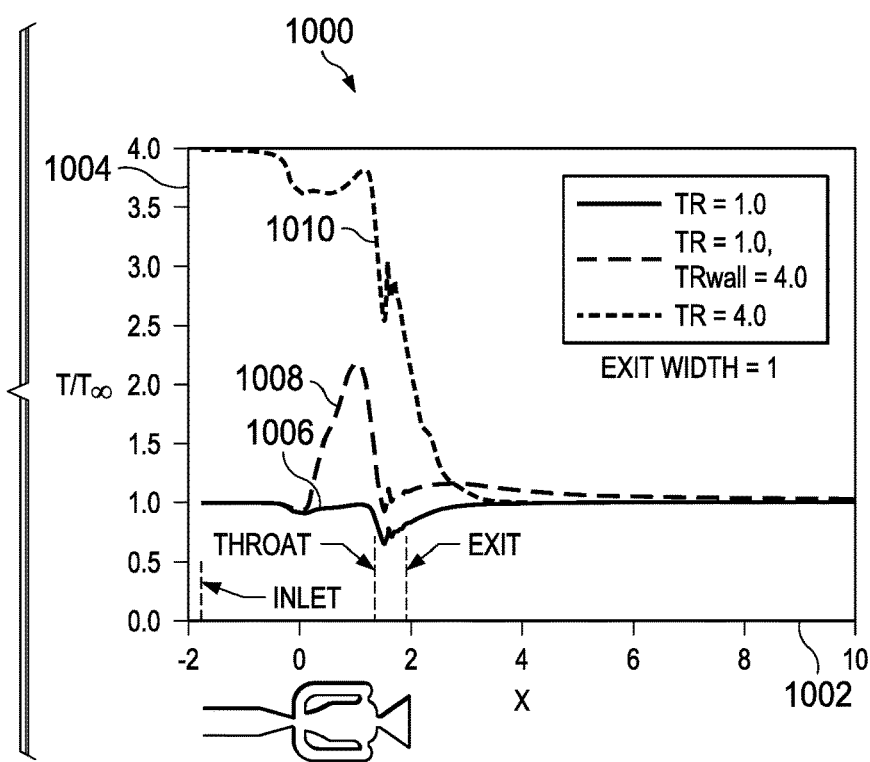
FIG. 10 is an illustration of thermal profiles for an active flow control system in accordance with an illustrative embodiment.

Turning now to FIG. 10, an illustration of thermal profiles for an active flow control system is depicted in accordance with an illustrative embodiment. Thermal data 1000 is an example of thermal data from an actuator of actuator array 810 of FIG. 8. Thermal data 1000 may be an example of thermal data from an actuator of actuator array 218 of FIG. 2.

Thermal data 1000 includes x-axis 1002 and y-axis 1004. X-axis 1002 is a distance measurement. Y-axis 1004 is a ratio of the temperature of air entering an inlet over the ambient temperature. The ambient temperature is the temperature outside of the aircraft. The ambient temperature is sometimes referred to as the conventional temperature. Line 1006 represents the temperature of air along the centerline of an actuator with a temperature equal to the ambient air temperature at the inlet. Line 1008 represents the temperature of air along the centerline of an actuator with the conventional air temperature at the inlet, and actuator walls heated to four times the conventional air temperature. Line 1010 represents the temperature of air along the centerline of an actuator with four times the conventional air temperature at the inlet.

The shape of the actuator in FIG. 6 is the same shape of the actuator in FIG. 10. Accordingly, line 1006 is the same as line 606 of FIG. 6. Likewise, line 1010 is the same as line 610 of FIG. 6.

As depicted, the temperature of air exiting the actuator in line 1010 is only twice the temperature of the conventional air flow input. The temperature of air exiting the actuator in line 1008 is about the same as the conventional air temperature. More specifically, the temperature of air exiting the actuator in line 1008 is less than 1.2 times the temperature of the conventional air flow input.

As depicted, line 1008 converges to about the conventional air temperature in a greater distance than line 1010. Line 1008 does not exceed 1.2 times the temperature of the conventional air flow input, however, line 1008 reaches nearly the conventional air flow input in about the length of the actuator.

Due to the relatively low temperature of air exiting the actuator in line 1008, surrounding structures may not be undesirably affected. More specifically, the output of line 1008 may not undesirably affect surrounding structures.

Figure 11:
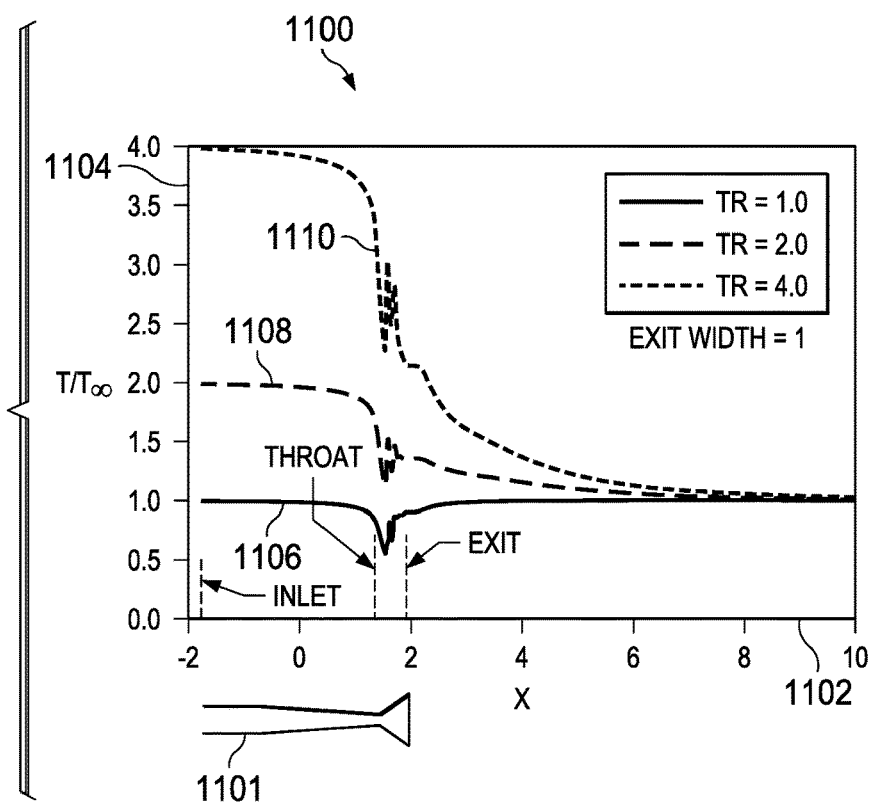
FIG. 11 is an illustration of thermal profiles for an active flow control system in accordance with an illustrative embodiment.

Turning now to FIG. 11, an illustration of thermal profiles for an active flow control system is depicted in accordance with an illustrative embodiment. Thermal data 1100 may be an example of thermal data from an actuator of actuator array 218 of FIG. 2. Thermal data 1100 is an example of thermal data from an actuator having a different design than actuators of actuator array 310 of FIG. 3 or actuator array 810 of FIG. 8. Thermal data 1100 is an example of thermal data from an actuator associated with a temperature control system similar to temperature control system 308 of FIG. 3.

Thermal data 1100 for actuator cross-section 1101 includes x-axis 1102 and y-axis 1104. X-axis 1102 is a distance measurement. Y-axis 1104 is a ratio of the temperature of air entering an inlet over the conventional temperature. Line 1106 represents the temperature of air along the centerline of an actuator with the ambient air temperature at the inlet. The ambient temperature is sometimes referred to as the conventional temperature. Line 1108 represents the temperature of air along the centerline of an actuator with twice the conventional air temperature at the inlet. Line 1110 represents the temperature of air along the centerline of an actuator with four times the conventional air temperature at the inlet.

As depicted, the temperature of air exiting the actuator in line 1110 is only twice the temperature of the conventional air flow input. The temperature of air exiting the actuator in line 1108 is less than 1.5 times the temperature of the conventional air flow input.

Each of line 1106, line 1108, and line 1110 converge outside of the actuator in about the length of the actuator. Due to the relatively rapid convergence of line 1106, line 1108, and line 1110, surrounding structures may not be undesirably affected. More specifically, the output of line 1108 or line 1110 may not undesirably affect surrounding structures beyond a distance of approximately half the actuator length. In some illustrative examples, insulation may additionally be placed around any surrounding structures to protect the surrounding structures from higher temperatures.

Figure 12:
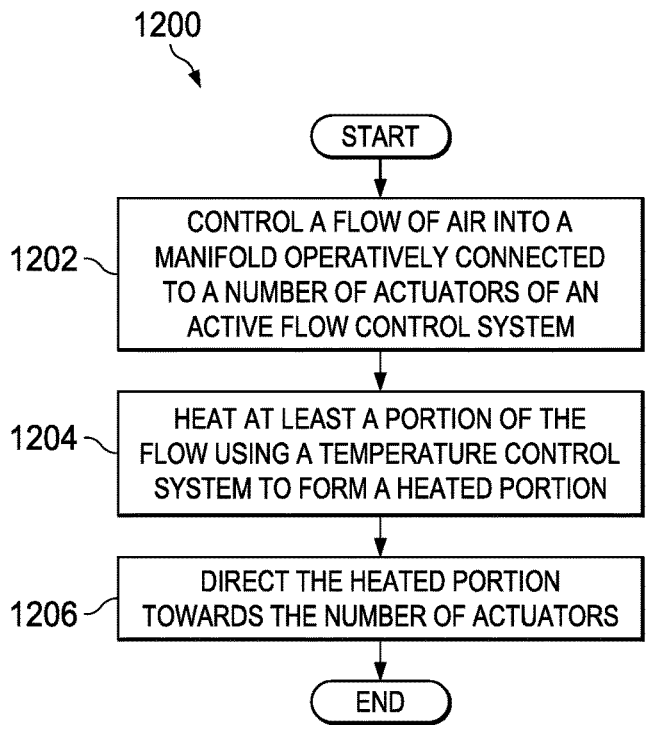
FIG. 12 is an illustration of a flowchart of a process for providing active flow control in accordance with an illustrative embodiment.

Turning now to FIG. 12, an illustration of a flowchart of a process for providing active flow control is depicted in accordance with an illustrative embodiment. Process 1200 is a process of providing active flow control using active flow control system 202 of FIG. 2. Process 1200 may provide active flow control to aircraft 100 of FIG. 1. Process 1200 may be implemented using active flow control system 300 of FIG. 3. Process 1200 may be implemented using active flow control system 800 of FIG. 8.

Process 1200 controls a flow of air into a manifold operatively connected to a number of actuators of an active flow control system (operation 1202). Process 1200 heats at least a portion of the flow of air using a temperature control system to form a heated portion (operation 1204). In some examples, heating the at least a portion of the flow of air using the temperature control system comprises routing the at least a portion towards a heater of the temperature control system using a proportioning valve of the temperature control system. In other examples, heating the at least a portion of the flow of air using the temperature control system comprises: providing power to resistive heater strips positioned in a portion of the manifold. In some examples, heating the at least a portion of the flow of air using the temperature controls system comprises: providing power to resistive heater strips positioned in the number of actuators. Heating the at least a portion of the flow of air using a temperature control system to form a heated portion decreases a mass flow through the number of actuators.

Process 1200 directs the heated portion towards the number of actuators (operation 1206). Afterwards, the process terminates. In some illustrative examples, directing the heated portion towards the number of actuators comprises: routing the heated portion using ductwork of the temperature control system, wherein the ductwork extends through a portion of the manifold, and wherein the ductwork directs the heated portion towards the number of actuators. In some illustrative examples, directing the heated portion towards the number of actuators further comprises: insulating surrounding structures by directing a remainder of the flow through the manifold around the ductwork.

Figure 13:
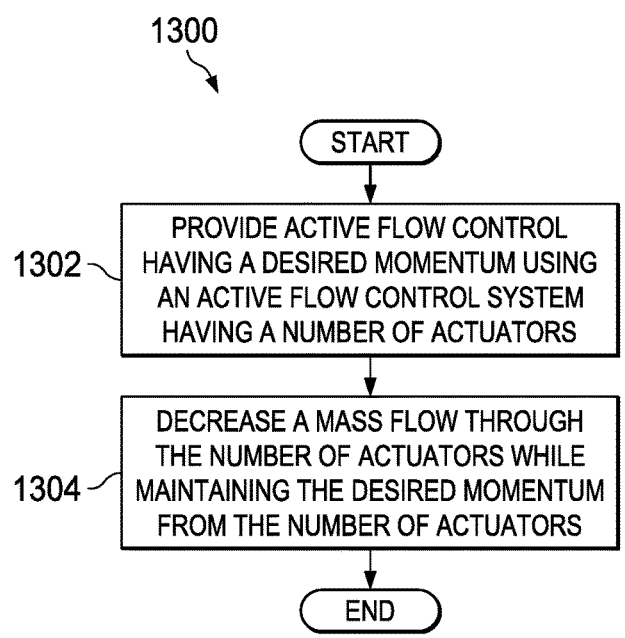
FIG. 13 is an illustration of a flowchart of a process for providing active flow control in accordance with an illustrative embodiment.

Turning now to FIG. 13, an illustration of a flowchart of a process for providing active flow control is depicted in accordance with an illustrative embodiment. Process 1300 is a process of providing active flow control using active flow control system 202 of FIG. 2. Process 1300 may provide active flow control to aircraft 100 of FIG. 1. Process 1300 may be implemented using active flow control system 300 of FIG. 3. Process 1300 may be implemented using active flow control system 800 of FIG. 8.

Process 1300 provides active flow control having a desired momentum using an active flow control system having a number of actuators (operation 1302). Process 1300 decreases a mass flow through the number of actuators while maintaining the desired momentum from the number of actuators (operation 1304). Decreasing the mass flow comprises heating at least a portion of a flow of air in the active flow control system using a temperature control system. In some illustrative examples, heating the at least a portion of the flow of air comprises: routing the at least a portion of the flow of air towards a heater of the temperature control system using a proportioning valve of the temperature control system. In other illustrative examples, heating the at least a portion of the flow of air comprises: providing power to resistive heater strips positioned in a portion of a manifold of the active flow control system.

The flowcharts and block diagrams in the different depicted embodiments illustrate the architecture, functionality, and operation of some possible implementations of apparatus and methods in an illustrative embodiment. In this regard, each block in the flowcharts or block diagrams may represent a module, a segment, a function, and/or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Figure 14:
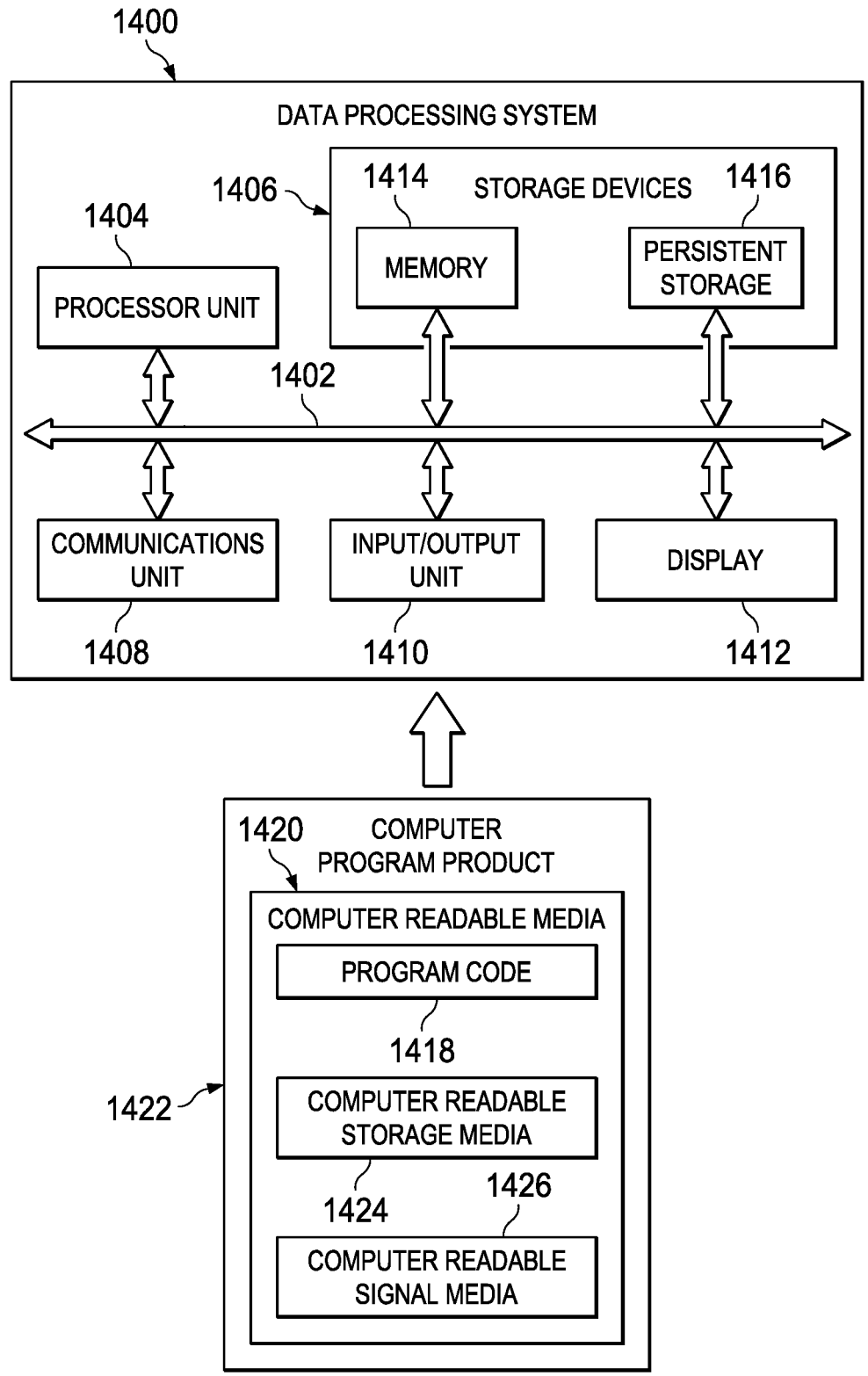
FIG. 14 is a data processing system in the form of a block diagram in accordance with an illustrative embodiment.

Turning now to FIG. 14, an illustration of a data processing system is depicted in the form of a block diagram in accordance with an illustrative embodiment. Data processing system 1400 may be used to implement controller 244 in FIG. 2. As depicted, data processing system 1400 includes communications framework 1402, which provides communications between processor unit 1404, storage devices 1406, communications unit 1408, input/output unit 1410, and display 1412. In some cases, communications framework 1402 may be implemented as a bus system.

Processor unit 1404 is configured to execute instructions for software to perform a number of operations. Processor unit 1404 may comprise a number of processors, a multi-processor core, and/or some other type of processor, depending on the implementation. In some cases, processor unit 1404 may take the form of a hardware unit, such as a circuit system, an application specific integrated circuit (ASIC), a programmable logic device, or some other suitable type of hardware unit.

Instructions for the operating system, applications, and/or programs run by processor unit 1404 may be located in storage devices 1406. Storage devices 1406 may be in communication with processor unit 1404 through communications framework 1402. As used herein, a storage device, also referred to as a computer-readable storage device, is any piece of hardware capable of storing information on a temporary and/or permanent basis. This information may include, but is not limited to, data, program code, and/or other information.

Memory 1414 and persistent storage 1416 are examples of storage devices 1406. Memory 1414 may take the form of, for example, a random access memory or some type of volatile or non-volatile storage device. Persistent storage 1416 may comprise any number of components or devices. For example, persistent storage 1416 may comprise a hard drive, a flash memory, a rewritable optical disk, a rewritable magnetic tape, or some combination of the above. The media used by persistent storage 1416 may or may not be removable.

Communications unit 1408 allows data processing system 1400 to communicate with other data processing systems and/or devices. Communications unit 1408 may provide communications using physical and/or wireless communications links.

Input/output unit 1410 allows input to be received from and output to be sent to other devices connected to data processing system 1400. For example, input/output unit 1410 may allow user input to be received through a keyboard, a mouse, and/or some other type of input device. As another example, input/output unit 1410 may allow output to be sent to a printer connected to data processing system 1400.

Display 1412 is configured to display information to a user. Display 1412 may comprise, for example, without limitation, a monitor, a touch screen, a laser display, a holographic display, a virtual display device, and/or some other type of display device.

In this illustrative example, the processes of the different illustrative embodiments may be performed by processor unit 1404 using computer-implemented instructions. These instructions may be referred to as program code, computer usable program code, or computer-readable program code and may be read and executed by one or more processors in processor unit 1404.

In these examples, program code 1418 is located in a functional form on computer-readable media 1420, which is selectively removable, and may be loaded onto or transferred to data processing system 1400 for execution by processor unit 1404. Program code 1418 and computer-readable media 1420 together form computer program product 1422. In this illustrative example, computer-readable media 1420 may be computer-readable storage media 1424 or computer-readable signal media 1426.

Computer-readable storage media 1424 is a physical or tangible storage device used to store program code 1418, rather than a medium that propagates or transmits program code 1418. Computer-readable storage media 1424 may be, for example, without limitation, an optical or magnetic disk or a persistent storage device that is connected to data processing system 1400.

Alternatively, program code 1418 may be transferred to data processing system 1400 using computer-readable signal media 1426. Computer-readable signal media 1426 may be, for example, a propagated data signal containing program code 1418. This data signal may be an electromagnetic signal, an optical signal, and/or some other type of signal that can be transmitted over physical and/or wireless communications links.

Figure 15:
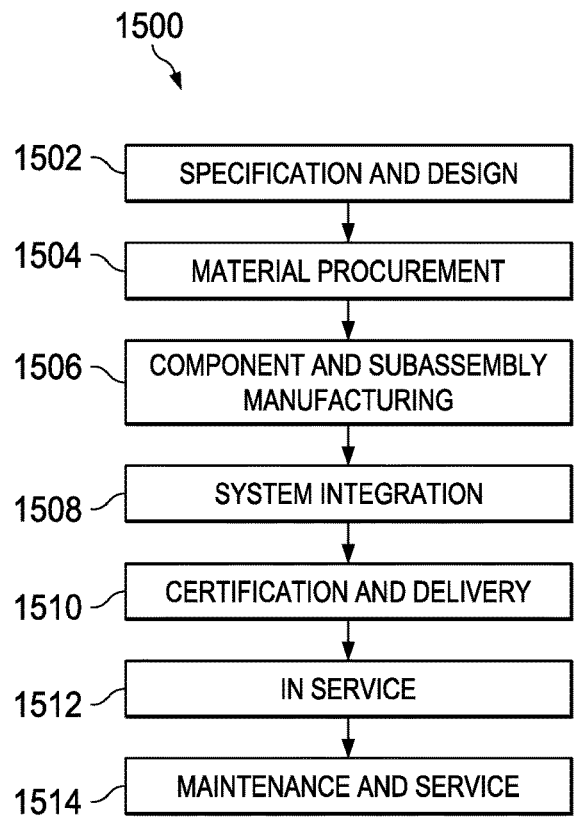
FIG. 15 is an illustration of an aircraft manufacturing and service method in the form of a block diagram in accordance with an illustrative embodiment.
Figure 16:
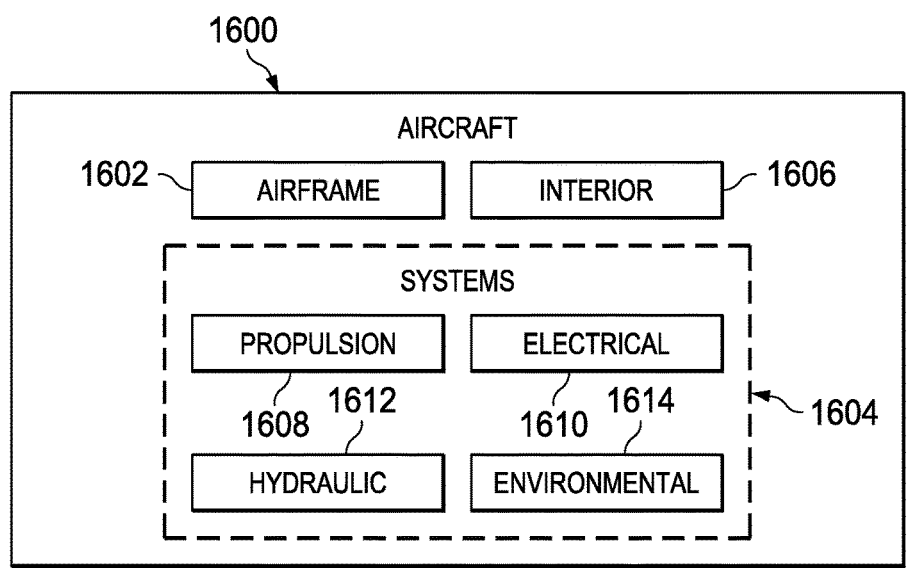
FIG. 16 is an illustration of an aircraft in the form of a block diagram in which an illustrative embodiment may be implemented.

Illustrative embodiments of the disclosure may be described in the context of aircraft manufacturing and service method 1500 as shown in FIG. 15 and aircraft 1600 as shown in FIG. 16. Turning first to FIG. 15, an illustration of an aircraft manufacturing and service method is depicted in accordance with an illustrative embodiment. During pre-production, aircraft manufacturing and service method 1500 may include specification and design 1502 of aircraft 1600 in FIG. 16 and material procurement 1504.

During production, component and subassembly manufacturing 1506 and system integration 1508 of aircraft 1600 takes place. Thereafter, aircraft 1600 may go through certification and delivery 1510 in order to be placed in service 1512. While in service 1512 by a customer, aircraft 1600 is scheduled for routine maintenance and service 1514, which may include modification, reconfiguration, refurbishment, and other maintenance or service.

Each of the processes of aircraft manufacturing and service method 1500 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 16, an illustration of an aircraft is depicted in which an illustrative embodiment may be implemented. In this example, aircraft 1600 is produced by aircraft manufacturing and service method 1500 in FIG. 15 and may include airframe 1602 with plurality of systems 1604 and interior 1606. Examples of systems 1604 include one or more of propulsion system 1608, electrical system 1610, hydraulic system 1612, and environmental system 1614. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1500.

One or more illustrative embodiments may be used during component and subassembly manufacturing 1506 of FIG. 15. For example, active flow control system 202 in FIG. 2 may be created during component and subassembly manufacturing 1506. Active flow control system 202 enhances aerodynamic performance of aircraft 1600 during in service 1512 of FIG. 15. Further, portions of active flow control system 202, such as temperature control system 212 of FIG. 2, may be replaced or serviced during maintenance and service 1514 of FIG. 15.

The illustrative embodiments provide a method and apparatus for active flow control. The active flow control system includes a temperature control system. The temperature control system heats at least a portion of a flow of air within the active flow control system. In some illustrative examples, the temperature control system may heat the at least a portion of the flow of air using a heater. In other illustrative examples, the temperature control system may heat the flow of air using a power source and resistive heater strips.

The mass flow rate and the momentum through the actuator are based on the thermodynamic properties of the fluid. The mass flow rate of the fluid is proportional to temperature. The momentum of the fluid is invariable to the temperature. As a result, higher air supply temperature results in reduced mass flow. Because the flow control effect is a function of the momentum, the net impact of increased supply temperature is reduced mass flow with no degradation in flow control performance. Increasing the fluid temperature is applicable to any flow control technique employing ejection jets. Thus, increasing the fluid temperature may be applied to constant blowing, sweeping jets, pulsed jets, or traverse actuation.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An active flow control system comprising:
    a flow control valve configured to control a flow of air into a manifold;
    the manifold operatively connected to a number of actuators;
    a temperature control system configured to heat at least a portion of the flow of air; and
    ductwork connected to a heater and running from the heater into a portion of the manifold, the ductwork extending inside the manifold to each of the number of actuators.

2. The active flow control system of claim 1, wherein the temperature control system comprises:
    a heater configured to heat at least the portion of the flow of air to form a heated portion.

3. The active flow control system of claim 2, wherein the temperature control system further comprises:
    a proportioning valve to direct the at least the portion of the flow of air towards the heater.

4. The active flow control system of claim 2, wherein the temperature control system further comprises:
    ductwork extending through a portion of the manifold, wherein the ductwork directs the heated portion towards the number of actuators.

5. The active flow control system of claim 4, wherein the temperature control system further comprises:
    a space between the ductwork and the manifold configured to insulate surrounding structures.

6. The active flow control system of claim 1, further comprising:
    an auxiliary power unit configured to provide the flow of air to the manifold.

7. The active flow control system of claim 1, further comprising:
    a flow proportioning valve configured to direct a portion of the flow of air to the heater.

8. The active flow control system of claim 7, wherein the heater is configured to heat the portion of the flow of air received from the flow proportioning valve portion.

9. A method comprising:
    controlling a flow of air into a manifold operatively connected to a number of actuators of an active flow control system;
    heating at least a portion of the flow of air using a temperature control system to form a heated portion; and
    directing the heated portion towards the number of actuators;

wherein ductwork connected to a heater runs from the heater into a portion of the manifold, the ductwork extending inside the manifold to each of the number of actuators.

10. The method of claim 9, wherein heating the at least the portion of the flow of air using the temperature control system comprises:
routing the at least the portion of the flow of air towards a heater of the temperature control system using a proportioning valve of the temperature control system.

11. The method of claim 10, wherein directing the heated portion towards the number of actuators comprises:
routing the heated portion using ductwork of the temperature control system, wherein the ductwork extends through a portion of the manifold, and wherein the ductwork directs the heated portion towards the number of actuators.

12. The method of claim 11, wherein directing the heated portion towards the number of actuators further comprises:
directing a remainder of the flow of air through the manifold around the ductwork.

13. The method of claim 9, wherein heating the at least the portion of the flow of air using the temperature control system to form the heated portion decreases a mass flow through the number of actuators.

14. The method of claim 9, further comprising:
configuring an auxiliary power unit to provide the flow of air to the manifold.

15. The method of claim 9, further comprising:
configuring a flow proportioning valve to direct a portion of the flow of air to the heater.

16. A method comprising:
providing active flow control having a desired momentum using an active flow control system having a number of actuators; and
decreasing a mass flow through the number of actuators while maintaining the desired momentum from the number of actuators;
wherein ductwork connected to a heater runs from the heater into a portion of a manifold, the ductwork extending inside the manifold to each of the number of actuators.

17. The method of claim 16, wherein decreasing the mass flow comprises:
heating at least a portion of a flow of air in the active flow control system using a temperature control system.

18. The method of claim 17, wherein the heating of the at least the portion of the flow of air comprises:
routing the at least the portion of the flow of air towards a heater of the temperature control system using a proportioning valve of the temperature control system.

19. The method of claim 16, further comprising:
configuring an auxiliary power unit to provide a flow of air to the manifold.

20. The method of claim 19, further comprising:
configuring a flow proportioning valve to direct a portion of the flow of air to the heater.

* * * * *

UNITED STATES PATENT AND TRADEMARK OFFICE
CERTIFICATE OF CORRECTION

PATENT NO. : 10,086,927 B2  
APPLICATION NO. : 15/131393  
DATED : October 2, 2018  
INVENTOR(S) : Schmilovich et al.

Page 1 of 1

It is certified that error appears in the above-identified patent and that said Letters Patent is hereby corrected as shown below:

In the Claims

Column 14, Line 33, change "a heater configured" to --the heater configured--
Column 14, Line 41, change "through a portion" to --through the portion--
Column 14, Line 54, change "to direct a portion" to --to direct the portion--

Signed and Sealed this
Twenty-ninth Day of January, 2019

Andrei Iancu
*Director of the United States Patent and Trademark Office*